(12) United States Patent
Kadowaki

(10) Patent No.: US 11,755,160 B2
(45) Date of Patent: Sep. 12, 2023

(54) ELECTRONIC EQUIPMENT, TOUCH SENSOR, AND POSITION DETECTION APPARATUS

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 80 days.

(21) Appl. No.: 17/542,085

(22) Filed: Dec. 3, 2021

(65) Prior Publication Data

US 2022/0091698 A1 Mar. 24, 2022

Related U.S. Application Data

(63) Continuation of application No. PCT/JP2020/023170, filed on Jun. 12, 2020.

(30) Foreign Application Priority Data

Jun. 27, 2019 (JP) ................. 2019-120181

(51) Int. Cl.
*G06F 3/044* (2006.01)
*G06F 3/041* (2006.01)
(Continued)

(52) U.S. Cl.
CPC ............ *G06F 3/0446* (2019.05); *G06F 1/206* (2013.01); *G06F 3/03547* (2013.01);
(Continued)

(58) Field of Classification Search
CPC ............... G06F 3/0446; G06F 3/04166; G06F 3/03547; G06F 3/0412; G06F 3/04182;
(Continued)

(56) References Cited

U.S. PATENT DOCUMENTS

2012/0044180 A1 2/2012 Matsui et al.
2014/0078101 A1* 3/2014 Katsurahira .......... G06F 3/0442
345/174
(Continued)

FOREIGN PATENT DOCUMENTS

JP 8-95701 A 4/1996
JP 2008-90623 A 4/2008
(Continued)

OTHER PUBLICATIONS

International Search Report dated Aug. 4, 2020, for the corresponding International Patent Application No. PCT/JP2020/023170, 2 pages.

*Primary Examiner* — Jimmy H Nguyen
(74) *Attorney, Agent, or Firm* — Seed IP Law Group LLP

(57) ABSTRACT

Electronic equipment includes a touch sensor including a plurality of electrodes arranged in a plane shape and separated from each other in an array direction, a differential amplifier that amplifies a difference between a positive-side signal and a negative-side signal selectively output from the plurality of electrodes and that outputs the difference, a position detection unit that detects a touch position in a sensor area that is formed by the touch sensor, based on an output signal from the differential amplifier, and a conductive part that is a part made of a conductive material or contains a conductive material and that is arranged to partially overlap the sensor area in plan view. The conductive part is arranged such that an outermost end point thereof in the array direction is positioned on one of the plurality of electrodes.

4 Claims, 17 Drawing Sheets

(51) Int. Cl.
*G06F 3/0354* (2013.01)
*G06F 1/20* (2006.01)

(52) U.S. Cl.
CPC ........ G06F 3/0412 (2013.01); G06F 3/04166 (2019.05); *G06F 3/04182* (2019.05); *G06F 2203/04112* (2013.01)

(58) Field of Classification Search
CPC .... G06F 3/038; G06F 3/03545; G06F 3/0442; G06F 3/0445; G06F 2203/04112; G06F 2203/04111; G06F 2203/0411; G06F 1/206
USPC ......................................................... 345/173
See application file for complete search history.

(56) References Cited

U.S. PATENT DOCUMENTS

| | | | |
|---|---|---|---|
| 2017/0372110 | A1 | 12/2017 | Uehara et al. |
| 2018/0364846 | A1* | 12/2018 | Ahn ................... G06F 3/0412 |
| 2019/0196641 | A1* | 6/2019 | Ryu ................... G06F 3/0414 |
| 2019/0340959 | A1* | 11/2019 | Park ................... H10K 50/844 |

FOREIGN PATENT DOCUMENTS

| | | | |
|---|---|---|---|
| JP | 2012-43394 A | 3/2012 | |
| JP | 2018-5291 A | 1/2018 | |

* cited by examiner

ELECTRONIC EQUIPMENT, TOUCH SENSOR, AND POSITION DETECTION APPARATUS

BACKGROUND

Technical Field

The present disclosure relates to electronic equipment, a touch sensor, and a position detection apparatus.

Description of the Related Art

A position detection apparatus of the so-called "differential amplification system" type is known that amplifies a difference between a signal of a positive-side electrode and a signal of a negative-side electrode of a touch sensor and that outputs the difference, as disclosed in Japanese Patent Laid-Open No. Hei 8-095701 (hereinafter, referred to as Patent Document 1). The difference between the signals from two electrodes parallel to each other can be acquired to achieve an advantageous effect of cancelling common mode noise generated in the same direction.

Electronic equipment includes, in addition to the touch sensor, one or more parts (hereinafter, referred to as a "conductive part(s)") made of a conductive material or contains a conductive material. Electromagnetic interference with the conductive part may occur, and common mode noise may be mixed into the detection signal of the touch sensor. The size of the conductive part is usually smaller than the size of a sensor area formed by the touch sensor, and the conductive part is arranged to partially overlap the sensor area in the plan view. Therefore, the magnitude of noise included in the detection signal may vary depending on the position in the sensor area.

However, when the magnitude of noise mixed in the signal of the positive-side electrode and the magnitude of noise mixed in the signal of the negative-side electrode are different in the differential amplification system as in Patent Document 1, the cancelling effect of the common mode noise cannot be obtained, and the influence of noise may be increased by the amplification.

BRIEF SUMMARY

An aspect of the present disclosure is directed to providing electronic equipment that can more reliably achieve the cancelling effect of noise in a differential amplification system, while taking into account the relative position of a conductive part that may become a noise source.

A first aspect of the present disclosure provides electronic equipment including a touch sensor including a plurality of electrodes arranged in a plane shape and separated from each other in an array direction, a differential amplifier that amplifies a difference between a positive-side signal and a negative-side signal selectively output from the plurality of electrodes and that outputs the difference, a position detection unit that detects a touch position in a sensor area that is formed by the touch sensor, based on an output signal from the differential amplifier, and a conductive part that is a part made of a conductive material or contains a conductive material and that is arranged to partially overlap the sensor area in plan view. The conductive part is arranged such that an outermost end point thereof in the array direction is positioned on one of the plurality of electrodes.

A second aspect of the present disclosure provides a touch sensor used along with a display panel that is configured to apply a drive voltage to matrix signal lines arrayed in a row direction and a column direction to drive a plurality of pixels to thereby display an image or a video in a display area. The touch sensor is arranged so as to at least partially overlap the display area in plan view. The touch sensor includes a plurality of electrodes arranged in a rectangular shape. The plurality of electrodes include a plurality of first electrodes extended in a first direction and separated from each other in an orthogonal direction relative to the first direction and a plurality of second electrodes extended in a second direction intersecting the first direction and separated from each other in an orthogonal direction relative to the second direction. At least one of the first direction and the second direction is inclined with respect to both the row direction and the column direction.

A third aspect of the present disclosure provides a position detection apparatus including the touch sensor according to the second aspect of the present disclosure, and a position detection unit that detects a touch position in a sensor area that is formed by the touch sensor, based on a detection signal from the touch sensor.

According to the first aspect of the present disclosure, the cancelling effect of noise based on the differential amplification system can be more reliably achieved, while taking into account the relative position of the conductive part that may become a noise source. According to the second and third aspects of the present disclosure, the mixing of common mode noise in the detection signal of the touch sensor, which is caused by electronic interference with the display panel, can be suppressed.

DETAILED DESCRIPTION

Various embodiments of electronic equipment, a touch sensor, and a position detection apparatus of the present disclosure will now be described with reference to the attached drawings. The present disclosure is not limited to the following embodiments and modifications, and the present disclosure may be readily further modified based on the present disclosure. In addition, various configurations may be combined as desired as long as there is no technical contradiction.

First Embodiment

Electronic equipment according to a first embodiment of the present disclosure will now be described with reference to FIGS. 1 to 8.

Circuit Configuration of Electronic Equipment 10

Figure 1:
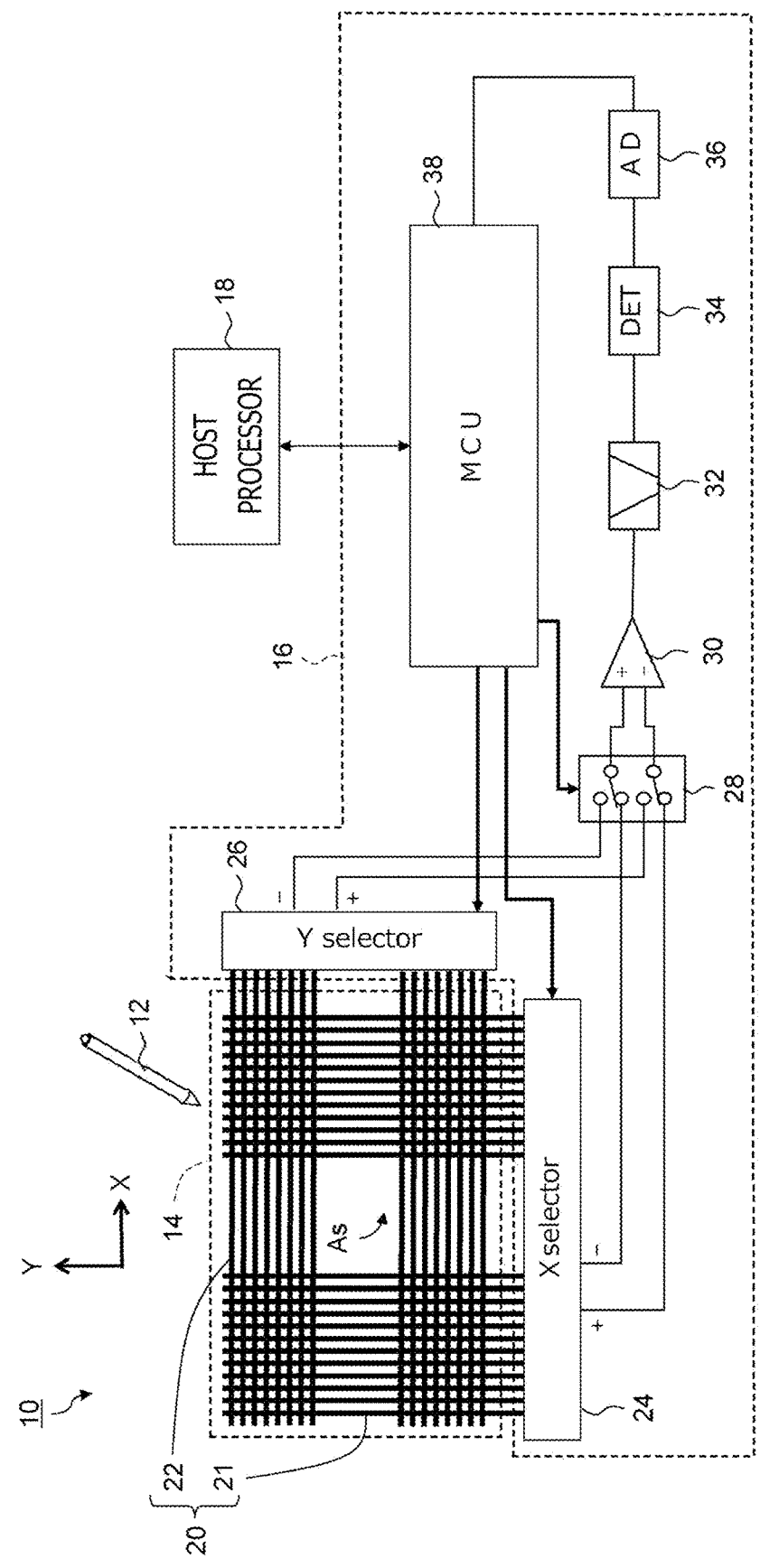
FIG. 1 is a circuit configuration diagram related to a position detection function of electronic equipment according to a first embodiment of the present disclosure.

FIG. 1 is a circuit configuration diagram related to a position detection function of electronic equipment 10 according to the first embodiment of the present disclosure. The electronic equipment 10 may be, for example, a tablet terminal, a smartphone, or a personal computer. A user can grip an electronic pen 12 and move the electronic pen 12 while pressing a pen tip against a touch surface of the electronic equipment 10 to draw pictures or letters in the electronic equipment 10. The electronic pen 12 is, for example, an active electrostatic (AES) or electro magnetic resonance (EMR) stylus.

The electronic equipment 10 specifically includes a touch sensor 14 that detects the approach of a conductor, such as the electronic pen 12 and a finger of the user, an integrated circuit (IC, hereinafter, a "touch IC 16") that controls the touch sensor 14, and a host processor 18 electrically connected to the touch IC 16.

Figure 2:
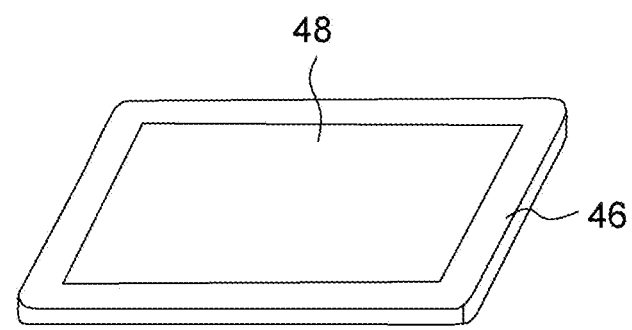
FIG. 2 is an exploded perspective view of the electronic equipment illustrated in FIG. 1.
Figure 2:
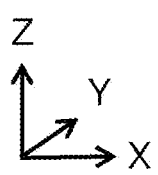
Figure 2:
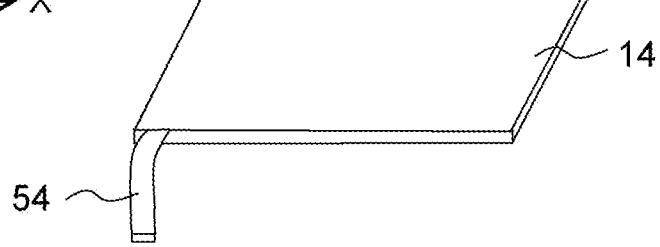
Figure 2:
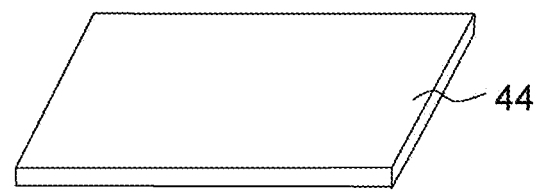
Figure 2:
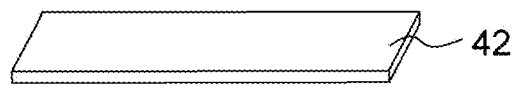
Figure 2:
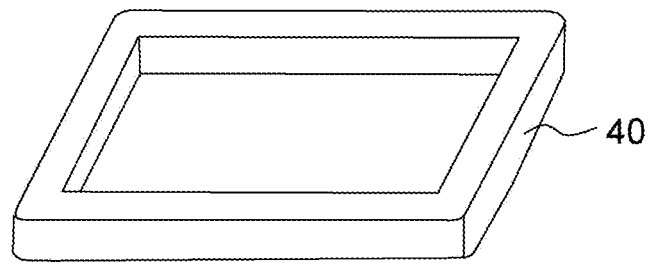

The touch sensor 14 is a capacitance sensor arranged on top of a display panel 44 (FIG. 2). The touch sensor 14 may be a mutual capacitance sensor or may be a self-capacitance sensor. The touch sensor 14 includes a plurality of electrodes 20 arranged in a plane shape and separated from each other in an array direction. The material of the electrodes 20 may be indium tin oxide (ITO) or may be metal, such as copper, silver, and gold.

The linear or band-like electrodes 20 include first electrodes 21 that detect positions (X-coordinates) in an X-direction and second electrodes 22 that detect positions (Y-coordinates) in a Y-direction. The first electrodes 21 and the second electrodes 22 are insulated by an insulating board (not illustrated) made of glass or resin. The plurality of first electrodes 21 are extended in the Y-direction, separated from each other in the X-direction, and arranged at equal intervals. The plurality of second electrodes 22 are extended in the X-direction, separated from each other in the Y-direction, and arranged at equal intervals. Therefore, the X-direction and the Y-direction illustrated in FIG. 1 correspond to an X-axis and a Y-axis of a "sensor coordinate system" defined in a sensor area As formed by the touch sensor 14. In the first embodiment, the sensor coordinate system coincides with a "display coordinate system" defined in a display area formed by the display panel 44 (FIG. 2).

The touch IC 16 includes an X selector 24, a Y selector 26, a switch 28, a differential amplifier 30, a band-pass filter (hereinafter, referred to as a "BP filter 32"), a detection circuit 34, an analog-to-digital (AD) converter 36, and a micro control unit (hereinafter, referred to as an "MCU 38").

The X selector 24 is a multiplexer connected to each of the plurality of first electrodes 21. The X selector 24 selects two electrodes from the plurality of first electrodes 21 according to a command signal from the MCU 38 and outputs two types of signals (X positive-side signal and X negative-side signal) from each electrode at the same time. The Y selector 26 is a multiplexer connected to each of the plurality of second electrodes 22. The Y selector 26 selects two electrodes from the plurality of second electrodes 22 according to a command signal from the MCU 38 and outputs two types of signals (Y positive-side signal and Y negative-side signal) from each electrode at the same time.

The switch 28 is connected to an output side of the X selector 24 and an output side of the Y selector 26. The switch 28 alternatively outputs the positive-side signal and the negative-side signal of one of the X selector 24 and the Y selector 26 according to a command signal from the MCU 38. The differential amplifier 30 amplifies the difference between the positive-side signal and the negative-side signal selectively output from the plurality of electrodes 20 through the switch 28 and outputs the difference.

The BP filter 32 is a filter circuit that passes a predetermined bandwidth around a frequency corresponding to an output signal from the electronic pen 12. The detection circuit 34 is a circuit that generates a detection signal from the output signal passing through the BP filter 32. The AD converter 36 is a signal converter that converts an analog signal into a digital signal.

The MCU 38 is a unit that can process the digital signal output from the AD converter 36 to detect a touch position in the sensor area As. The MCU 38 reads a position detection program from a memory (not illustrated) and executes the program to fulfill a "pen detection function" of detecting the state of the electronic pen 12 and a "touch detection function" of detecting the touch by a finger of the user or the like.

The pen detection function includes, for example, a scan function (global scan or sector scan) of the touch sensor 14, a reception and analysis function of a downlink signal, an estimation function of the state (for example, position, posture, and pen pressure) of the electronic pen 12, and a generation and transmission function of an uplink signal including a command for the electronic pen 12. The touch detection function includes, for example, a scan function of the touch sensor 14, a creation function of a detection map (two-dimensional distribution of detection level) in the sensor area As, and an area classification function (for example, classification of finger, palm, and the like) on the detection map.

The host processor 18 includes an arithmetic processing unit including a central processing unit (CPU), a microprocessing unit (MPU), and a graphics processing unit (GPU). The host processor 18 can read and execute programs stored in the memory (not illustrated) to execute various functions including generation of digital inks, creation of image signals, and transmission and reception control of data.

Apparatus Configuration of Electronic Equipment 10

Figure 3:
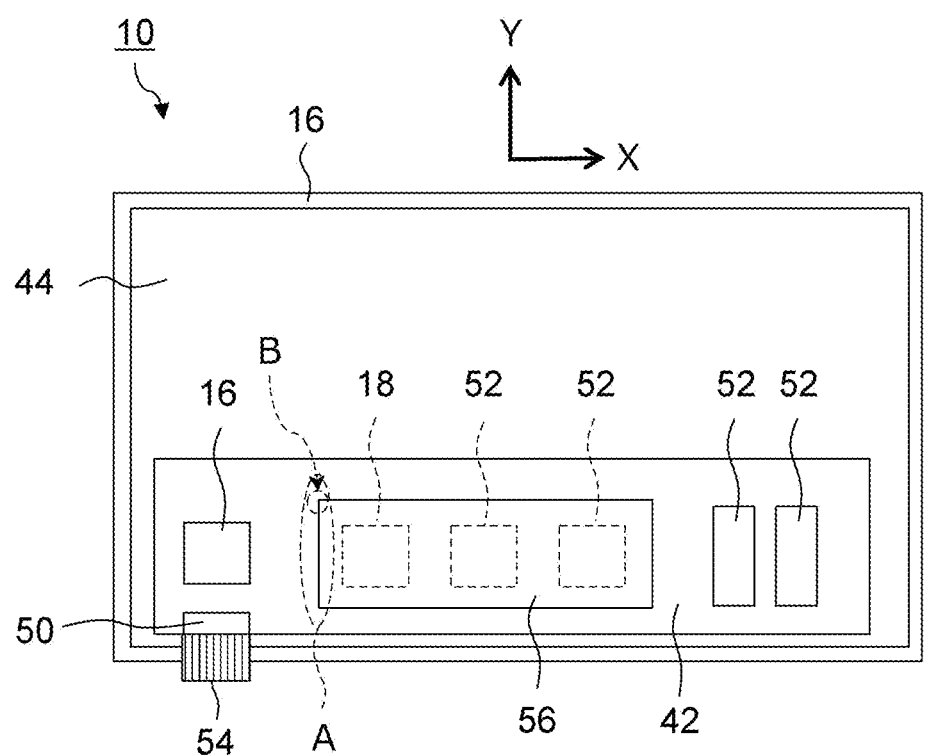
FIG. 3 depicts a relative positional relation among a main board, a display panel, and a touch sensor illustrated in FIG. 2.

FIG. 2 is an exploded perspective view of the electronic equipment 10 illustrated in FIG. 1. FIG. 3 depicts a relative positional relation among a main board 42, the display panel 44, and the touch sensor 14 illustrated in FIG. 2. The electronic equipment 10 includes, from the back side, a back cover 40, the main board 42, the display panel 44, the touch sensor 14, and a front cover 46 that are placed on top of each other. Although the touch sensor 14 is an "external" sensor attached to the display panel 44 from the outside in the example of FIG. 2, the touch sensor 14 may be an "internal" (in more detailed classification, on-cell or in-cell) sensor integrated with the display panel 44 instead of the "external" sensor.

The back cover 40 and the front cover 46 are members providing a housing that houses electronic parts in the electronic equipment 10. A protection panel 48 with high transmittance is provided on the front cover 46 so as to cover the entire opening formed on the main surface of the front cover 46.

The display panel 44 includes, for example, a liquid crystal panel, an organic electro luminescence (EL) panel, or electronic paper. The display panel 44 applies a drive voltage to matrix signal lines arrayed in the row direction and the column direction to drive a plurality of pixels to thereby display an image or a video in the display area.

The main board 42 is a board providing an electric circuit that activates the electronic equipment 10. In addition to the touch IC 16 and the host processor 18 which are described above, a connector 50 and various electronic parts 52 are arranged on the main board 42 as illustrated in FIG. 3. The connector 50 can electrically connect a flexible printed circuit board (hereinafter, an "FPC board 54"), which is provided on an end portion of the touch sensor 14, and the touch IC 16. Examples of the electronic parts 52 include a drive IC of the display panel 44, a memory, a wireless communication module, a power supply circuit, and an electronic element (for example, coil).

With a rise in the internal temperature or the ambient temperature, the processing performance of the electronic parts including the processor may be reduced, or the electronic parts may malfunction. To suppress this phenomenon, a heat sink or a heat conduction path for releasing the heat generated inside the equipment is provided on the electronic equipment 10 in some cases. In the example of FIG. 3, a heat sink 56 (a conductive part) containing a conductive material, such as aluminum (Al) and copper (Cu), is attached on the host processor 18 and the electronic parts 52.

Arrangement of Heat Sink 56

Figure 4:
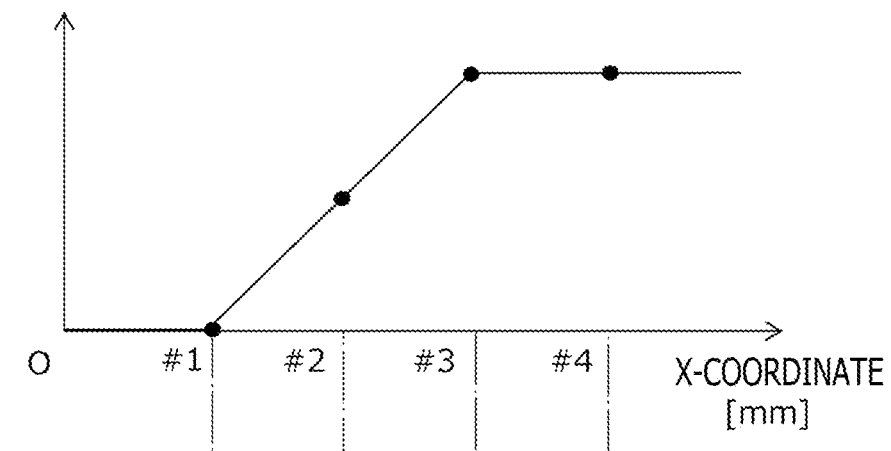
FIG. 4 is an enlarged view of portion A in FIG. 3.
Figure 4:
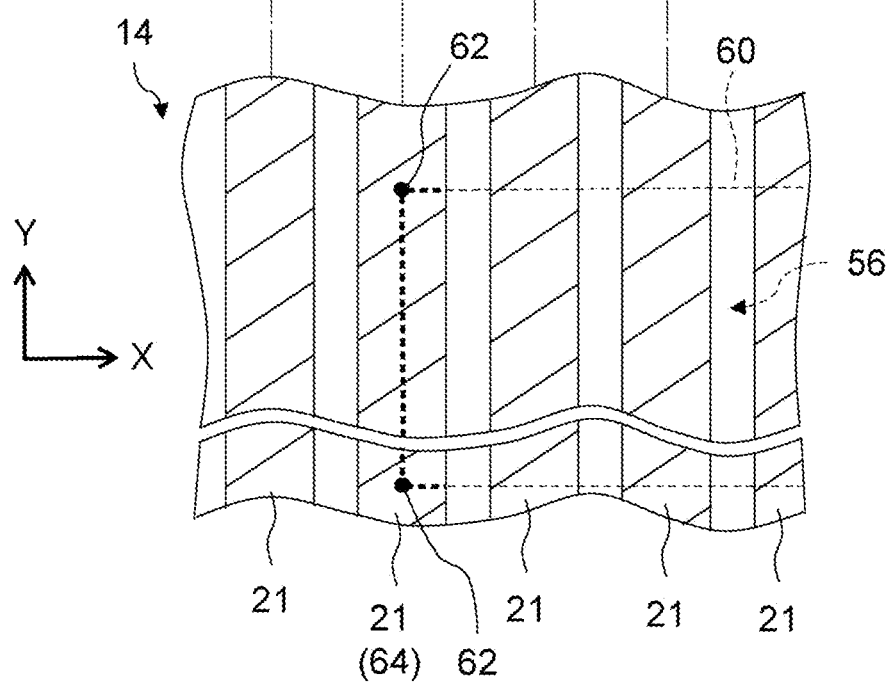

FIG. 4 is an enlarged view of A in FIG. 3, illustrating a relative positional relation between the touch sensor 14 and the heat sink 56. In the following description, identification numbers #1, #2, #3, and #4 are provided from left to right to distinguish the plurality of first electrodes 21. For the convenience of illustration, only the first electrodes 21 of the plurality of electrodes 20 included in the touch sensor 14 are depicted, and the second electrodes 22 are not illustrated.

A dashed line illustrated in plan view on the lower side of FIG. 4 corresponds to a contour line 60 of the heat sink 56 in a rectangular shape. Assuming that the outermost point of the contour line 60 in the X-direction is an "end point 62," the end point 62 is positioned on the first electrode 21 "#2." Hereinafter, the first electrode 21 overlapping the position of the end point 62 will be referred to as an "end-side electrode 64." In this case, the first electrode 21 "#1" is outside of the end-side electrode 64, and the first electrodes 21 "#3" and "#4" are inside of the end-side electrode 64.

A graph on the upper side of FIG. 4 illustrates a correspondence between the X-coordinate (unit: mm) and an overlapping area S (unit: mm$^2$). The "overlapping area S" corresponds to the area of the overlapping portion of each first electrode 21 and the heat sink 56. As can be understood from the graph, the overlapping area S at "#1" has a minimum value (=0), and the overlapping area at "#3" and "#4" has a maximum value. It should be noted here that the overlapping area S at "#2" has a value between the maximum value and the minimum value (that is, an intermediate value).

Figure 5:
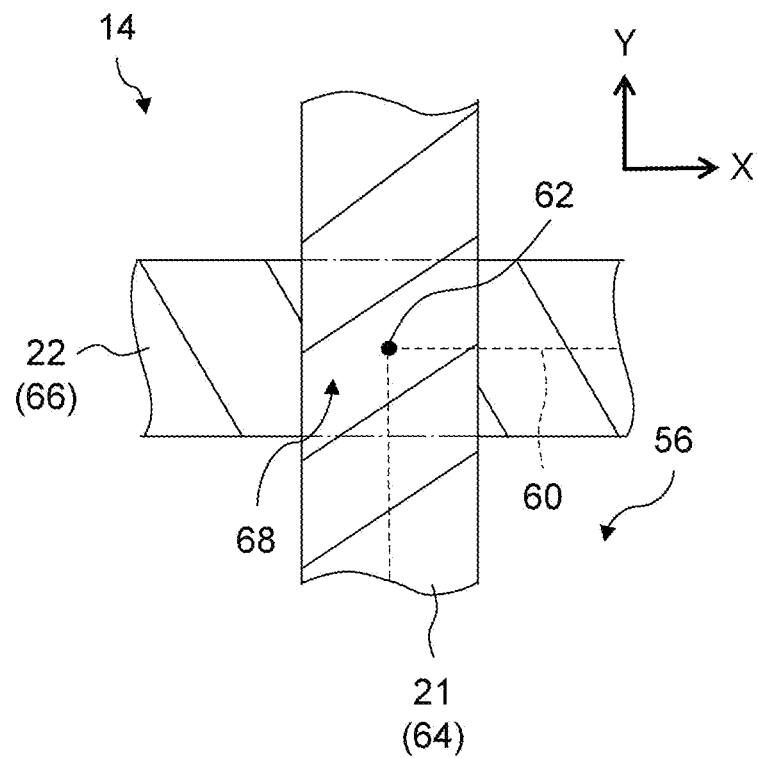
FIG. 5 is an enlarged view of portion B in FIG. 3.

FIG. 5 is an enlarged view of B in FIG. 3, illustrating a relative positional relation among the first electrode 21, the second electrode 22, and the heat sink 56 near the end point 62. For the convenience of illustration, only one first electrode 21 and one second electrode 22 are depicted.

The heat sink 56 is arranged such that the long side is parallel to the X-direction and the short side is parallel to the Y-direction. In this case, the end point 62 is an outermost point of the contour line 60 in the X-direction and is also an outermost point in the Y-direction. The end point 62 is positioned on an intersection area 68 where one electrode (that is, the end-side electrode 64) of the plurality of first electrodes 21 and one electrode (that is, an end-side electrode 66) of the plurality of second electrodes 22 intersect.

Figure 6A:
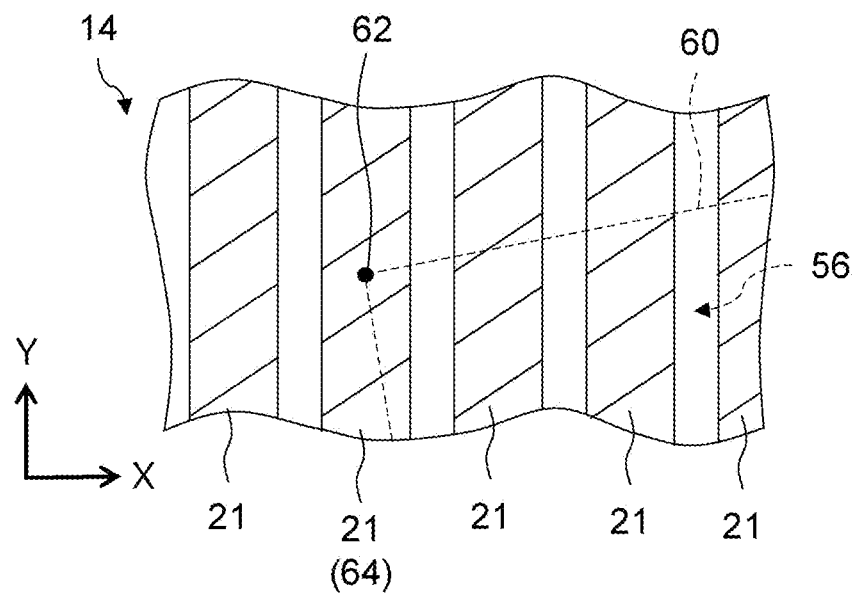
FIG. 6A depicts another configuration of a heat sink in FIG. 4.
Figure 6B:
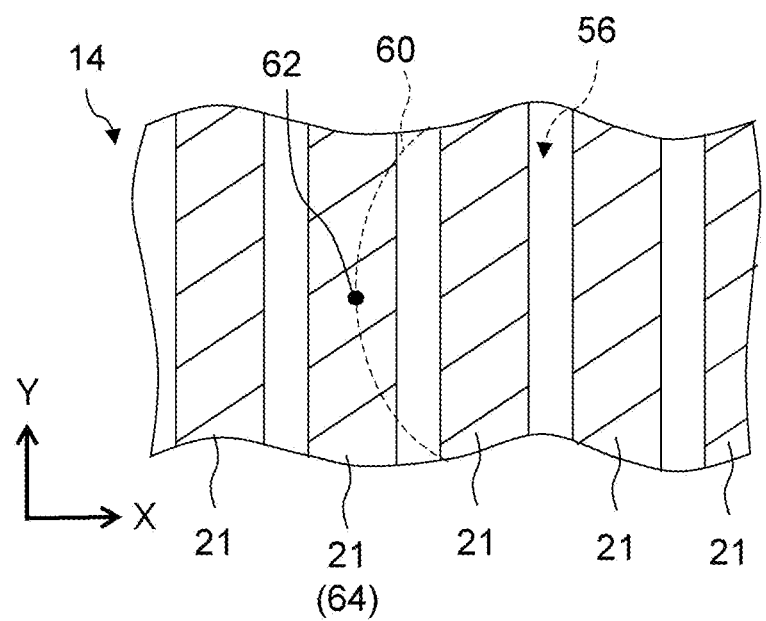
FIG. 6B depicts still another configuration of the heat sink in FIG. 4.

Note that the arrangement or the shape of the heat sink 56 is not limited to the example illustrated in FIGS. 4 and 5. For example, the heat sink 56 may be titled with respect to the sensor area As of the touch sensor 14 as illustrated in FIG. 6A. In addition, the contour line 60 of the heat sink 56 may include not only linear components, but also curve components as illustrated in FIG. 6B.

Effects of Electronic Equipment 10

The electronic equipment 10 according to the first embodiment is configured in this way. Next, effects of the electronic equipment 10 will be described with reference to FIGS. 7 and 8.

Figure 7:
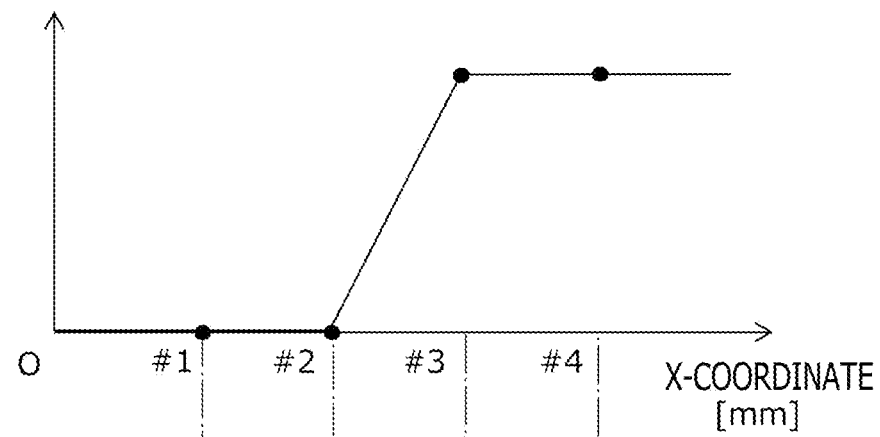
FIG. 7 depicts a comparative example corresponding to FIG. 4.
Figure 7:
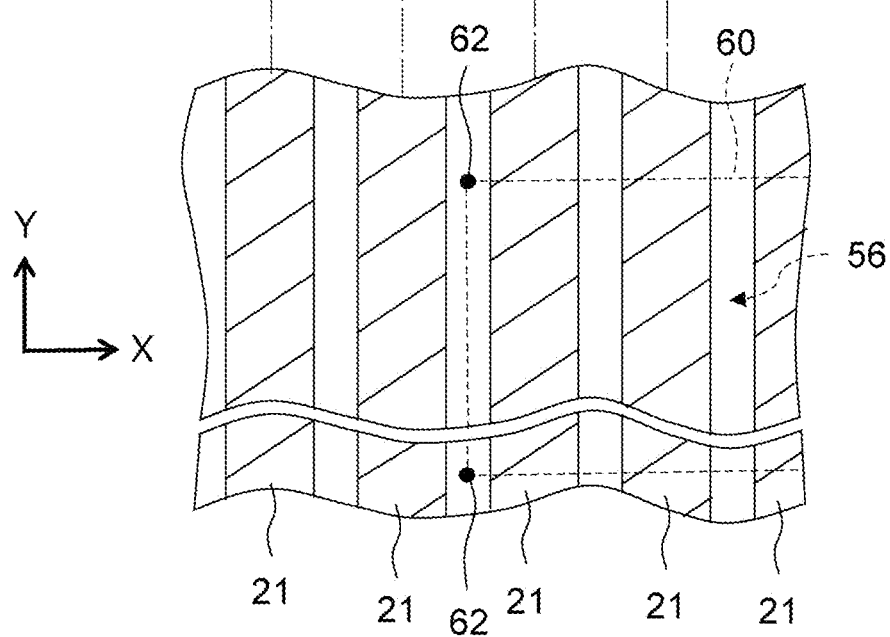

FIG. 7 depicts a comparative example corresponding to FIG. 4 that illustrates an example embodiment of the present disclosure, and FIG. 7 illustrates a relative positional relation between the touch sensor 14 and the heat sink 56. As can be understood from the plan view on the lower side of FIG. 7, the end point 62 on the contour line 60 is positioned in a gap between the first electrodes 21 "#2" and "#3." In this case, the overlapping area S at "#1" and "#2" has a minimum value (=0), and the overlapping area S at "#3" and "#4" has a maximum value as illustrated in the graph on the upper side of FIG. 7. It should be noted here that the overlapping area S rapidly changes between sections of "#2" and "#3."

Figure 8:
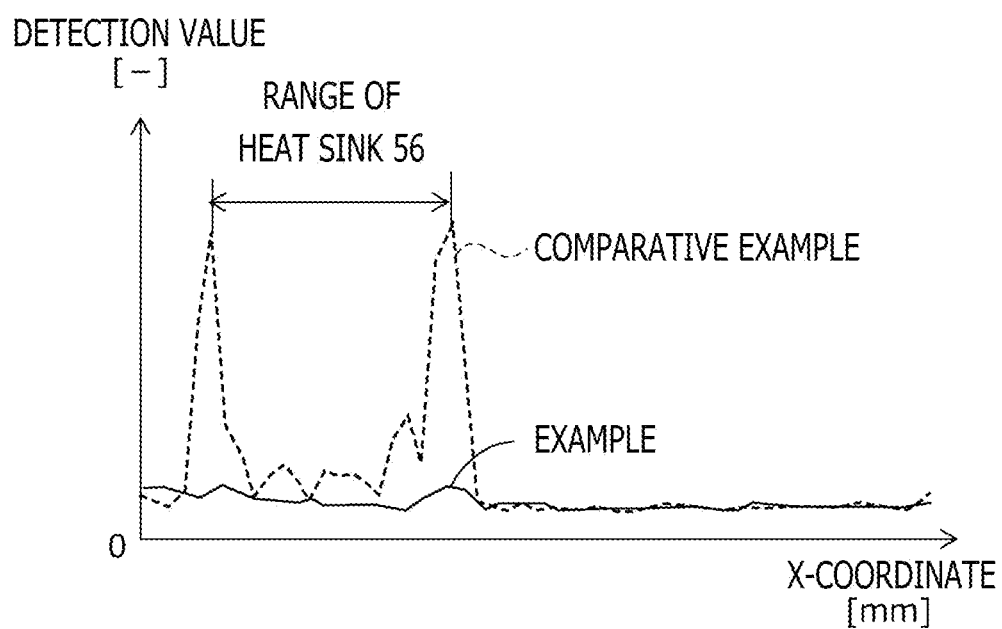
FIG. 8 depicts an advantageous effect of an arrangement relation in FIG. 4.

FIG. 8 depicts an advantageous effect of an arrangement relation in FIG. 4. The horizontal axis of the graph indicates the X-coordinate (unit: mm), and the vertical axis of the graph indicates the detection value (unit: none) acquired by the MCU 38. It is assumed here that the electronic pen 12 is in a "hover state" in which the electronic pen 12 is not in contact with the touch surface (protection panel 48 in FIG. 2) of the electronic equipment 10.

As can be understood from the comparative example (graph of dashed line), peaks of the detection values are at positions of both ends of the heat sink 56. The reason may be that the overlapping area S illustrated in FIG. 7 rapidly changes between the sections of "#2" and "#3" to thereby create a difference in the magnitude of common mode noise mixed in the signal of the positive-side electrode and the magnitude of common mode noise mixed in the signal of the negative-side electrode, wherein the difference is amplified through the differential amplifier 30 (FIG. 1).

On the other hand, the height of the peaks at the positions of both ends of the heat sink 56 is significantly suppressed as can be understood from the example embodiment of the present disclosure (graph of solid line). The reason may be that the overlapping area S illustrated in FIG. 4 has the intermediate value at the section of "#2," and the rapid change in the overlapping area S is mitigated compared to the case of the comparative example, so that the above-described difference in the magnitude of common mode noise is relatively small.

Particularly, the mitigation effect of the change described above is more noticeable when the heat sink 56 is arranged such that the length of the contour line 60 overlapping the end-side electrode 64 (a part indicated by a thick dashed line on the lower side of FIG. 4) is equal to or greater than 10 mm. It is preferable that the end point 62 be at a position close to the center line of the end-side electrodes 64 and 66 (for example, in a range within ±W/4 from the center line where W represents the width of the end-side electrodes 64 and 66).

Other than the heat sink 56 or the heat conduction path, the conductive part may be various electronic parts 52 arranged on the main board 42 (FIG. 3) or may be a module (for example, a battery pack) separate from the main board 42. Particularly, considering the fact that the mitigating effect of the change described above increases with an increase in the length of the contour line 60, it is preferable that the conductive part be a part with a relatively large occupied area, such as the heat sink 56, the heat conduction path, and the battery pack.

As described above, the electronic equipment 10 includes the touch sensor 14 including the plurality of electrodes 20 arranged in a plane shape and separated from each other in the array direction; the differential amplifier 30 that amplifies the difference between the positive-side signal and the negative-side signal selectively output from the plurality of electrodes 20 and that outputs the difference; the MCU 38 (a position detection unit) that detects the touch position in the sensor area As, which is formed by the touch sensor 14, based on the output signal from the differential amplifier 30; and the conductive part (heat sink 56 here) that is a part made of a conductive material or contains a conductive material and that is the conductive part arranged to partially overlap the sensor area As in plan view. The heat sink 56 is arranged such that the outermost end point 62 in the array direction is positioned on one of the plurality of electrodes 20.

In this way, the outermost end point 62 in the array direction is positioned on one of the plurality of electrodes 20. This can mitigate the rapid change in the overlapping area S, which is the area of the overlapping portion of each first electrode 21 and the heat sink 56, in the array direction and can reduce the difference in the magnitude of common mode noise mixed in the signal of the positive-side electrode and in the signal of the negative-side electrode. This arrangement more reliably achieves the cancelling effect of noise based on the differential amplification system, while taking into account the relative location of the heat sink 56 that may become a noise source.

The plurality of electrodes 20 may include the plurality of first electrodes 21 separated from each other in the X-direction (first direction) and the plurality of second electrodes 22 separated from each other in the Y-direction (second direction) intersecting the X-direction, and the heat sink 56 may be arranged such that the end point 62 is positioned on the intersection area 68 where one of the plurality of first electrodes 21 and one of the plurality of second electrodes 22 (end-side electrodes 64 and 66) intersect. This fulfills the above-described cancelling effect of noise at the same time for the first electrodes 21 and the second electrodes 22.

Second Embodiment

Next, electronic equipment 100 according to a second embodiment will be described with reference to FIGS. 9 to 16B. The same reference signs are assigned to the components or the functions similar to those of the first embodiment, and the description of the components or the functions may be omitted.

Apparatus Configuration of Electronic Equipment 100

Figure 9:
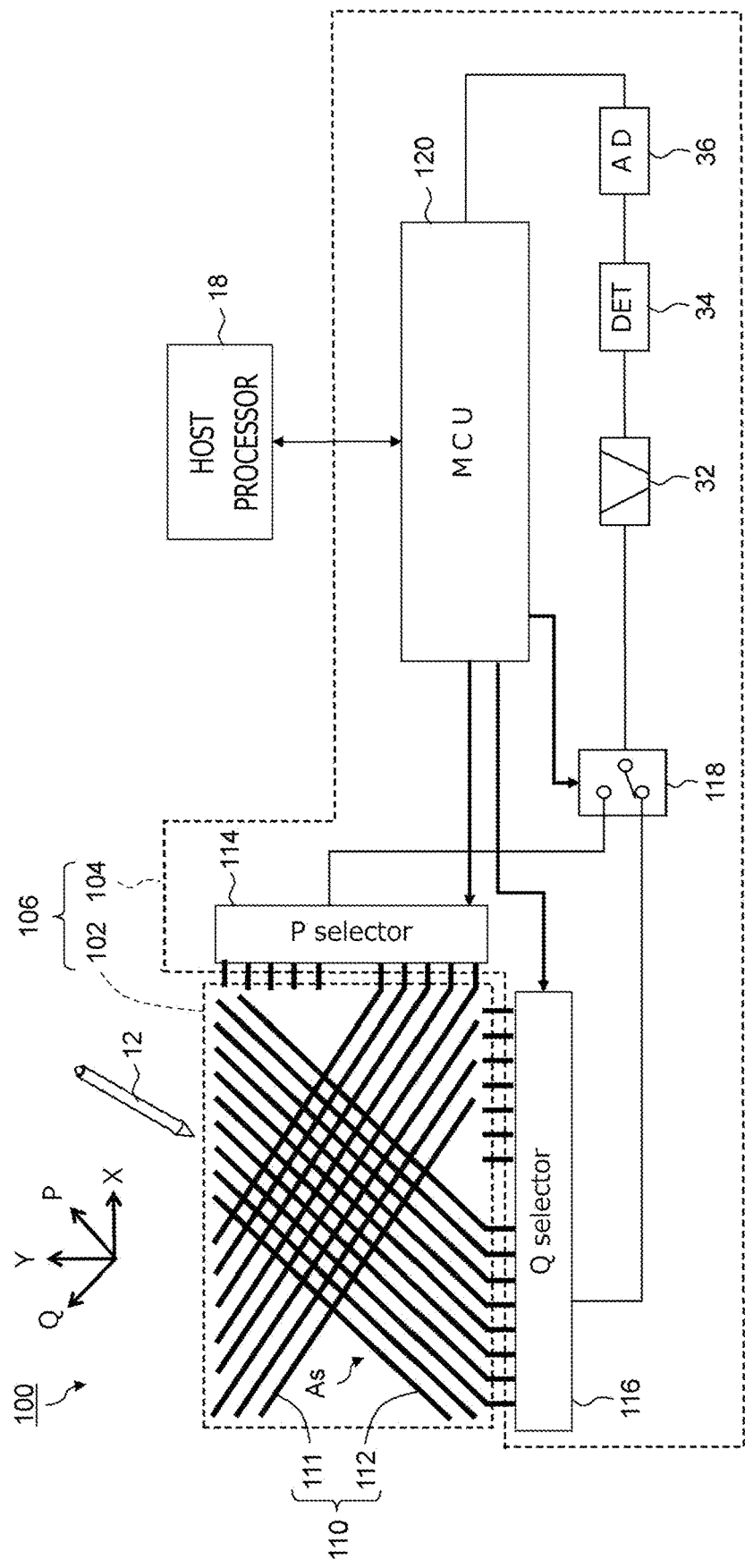
FIG. 9 is a circuit configuration diagram related to a position detection function of electronic equipment according to a second embodiment of the present disclosure.

FIG. 9 is a circuit configuration diagram related to the position detection function of the electronic equipment 100 according to the second embodiment of the present disclosure. The electronic equipment 100 may be, for example, a tablet terminal, a smartphone, or a personal computer, as in the case of the first embodiment (electronic equipment 10 in FIG. 1).

The electronic equipment 100 specifically includes a touch sensor 102 configured differently from the case of the first embodiment (touch sensor 14 in FIG. 1), a touch IC 104 that controls the touch sensor 102, and the host processor 18 electrically connected to the touch IC 104. The touch sensor 102 and the touch IC 104 here correspond to a position detection apparatus 106 that detects the touch position of the electronic equipment 100.

Figure 10:
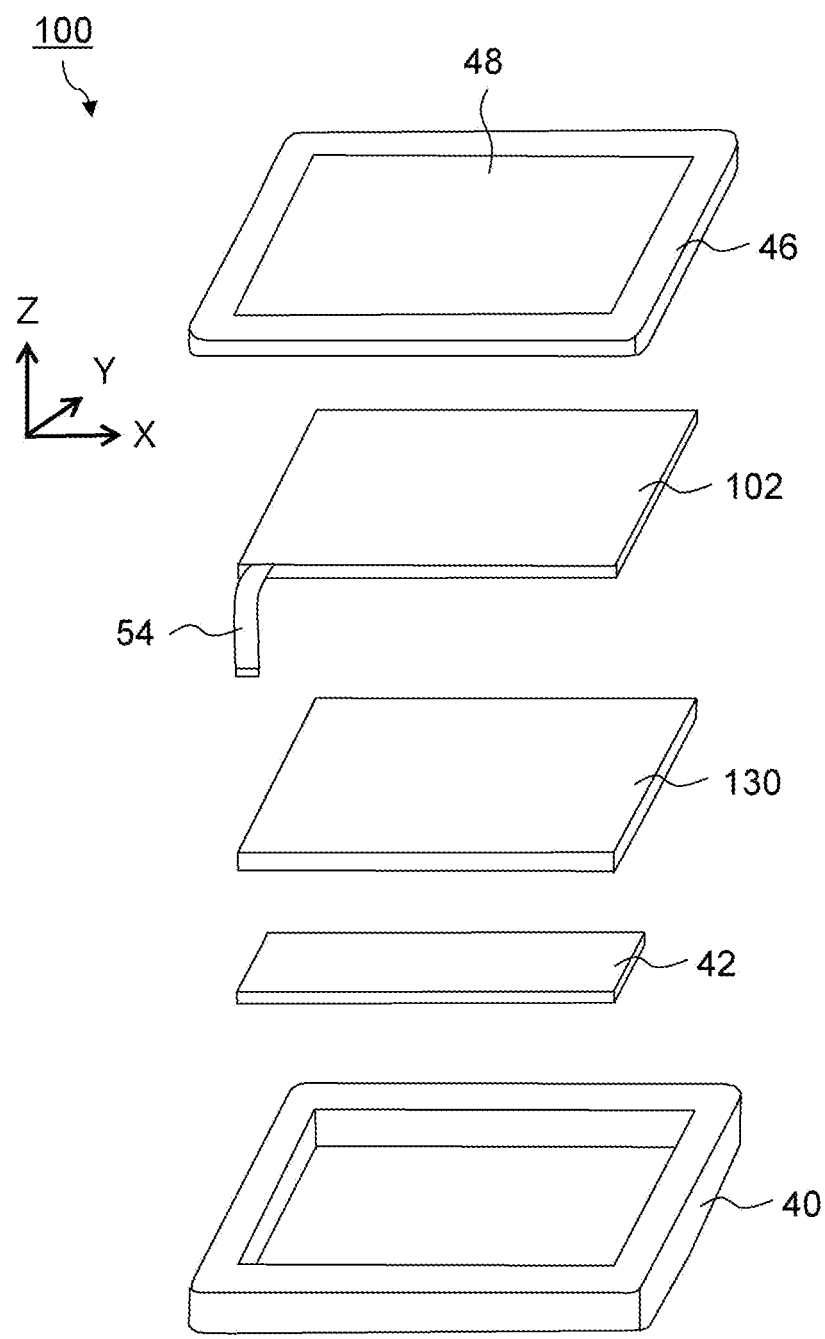
FIG. 10 is an exploded perspective view of the electronic equipment illustrated in FIG. 9.

The touch sensor 102 is a capacitance (specifically, mutual capacitance or self-capacitance) sensor arranged on top of a display panel 130 (FIG. 10). The touch sensor 102 includes a plurality of electrodes 110 arranged in a plane shape and separated from each other in the array direction. Although the material of the electrodes 110 may be ITO, it is assumed here that the material is metal, such as copper, silver, and gold.

A P-direction and a Q-direction illustrated in FIG. 9 correspond to a P-axis and a Q-axis of a "sensor coordinate system" defined in the sensor area As formed by the touch sensor 102. Note that, in the second embodiment, the sensor coordinate system does not coincide with a "display coordinate system" defined in a display area formed by the display panel 130 (FIG. 10).

The electrodes 110 include first electrodes 111 that detect positions in the P-direction (second direction) and second electrodes 112 that detect positions in the Q-direction (first direction). The plurality of first electrodes 111 are extended in the Q-direction, separated from each other in the orthogonal direction relative to the Q-direction (that is, the P-direction), and arranged at equal intervals. The plurality of second electrodes 112 are extended in the P-direction, separated from each other in the orthogonal direction relative to the P-direction (that is, the Q-direction), and arranged at equal intervals.

The touch IC 104 includes a P selector 114, a Q selector 116, a switch 118, the BP filter 32, the detection circuit 34, the AD converter 36, and an MCU 120. Note that the differential amplifier 30 (FIG. 1) may be provided on the touch IC 104 as in the circuit configuration of the first embodiment.

The P selector 114 is a multiplexer connected to each of the plurality of first electrodes 111. The P selector 114 selects one of the plurality of first electrodes 111 according to a command signal from the MCU 120 and sequentially outputs P signals from the selected electrode. The Q selector 116 is a multiplexer connected to each of the plurality of second electrodes 112. The Q selector 116 selects one of the plurality of second electrodes 112 according to a command signal from the MCU 120 and sequentially outputs Q signals from the selected electrode.

The switch 118 is connected to an output side of the P selector 114 and an output side of the Q selector 116. The switch 118 alternatively outputs the signals of one of the P selector 114 and the Q selector 116 according to a command signal from the MCU 120.

The MCU 120 is a unit that can process the digital signal output from the AD converter 36 to detect the touch position in the sensor area As. The MCU 120 uses the pen detection function or the touch detection function to calculate the position of the sensor coordinate system and applies a coordinate transformation to the obtained P-Q coordinate values to convert the position into the position (X-Y coordinate values) of the display coordinate system. The coordinate transformation is uniquely specified according to the relative positional relation between the touch sensor 102 and the display panel 130. When both the sensor coordinate system and the display coordinate system are Cartesian coordinate systems, the coordinate transformation is a two-dimensional affine transformation with a rotation by an angle $\theta$ [rad] (where, $0<\theta<\pi/2$) about a fixed point.

Apparatus Configuration of Electronic Equipment 100

FIG. 10 is an exploded perspective view of the electronic equipment 100 illustrated in FIG. 9. As in the case of the first embodiment (electronic equipment 10 of FIG. 2), the electronic equipment 100 includes, from the back side, the back cover 40, the main board 42, the display panel 130, the touch sensor 102, and the front cover 46 that are placed on top of each other. As in the case of the first embodiment, the touch sensor 102 may be an external sensor or may be an internal (on-cell or in-cell) sensor.

The display panel 130 includes, for example, a liquid crystal panel, an organic EL panel, electronic paper, or the like. The display panel 130 applies a drive voltage to matrix signal lines arrayed in the row direction and the column direction to drive a plurality of pixels 134 to thereby display an image or a video in the display area.

Figure 11:
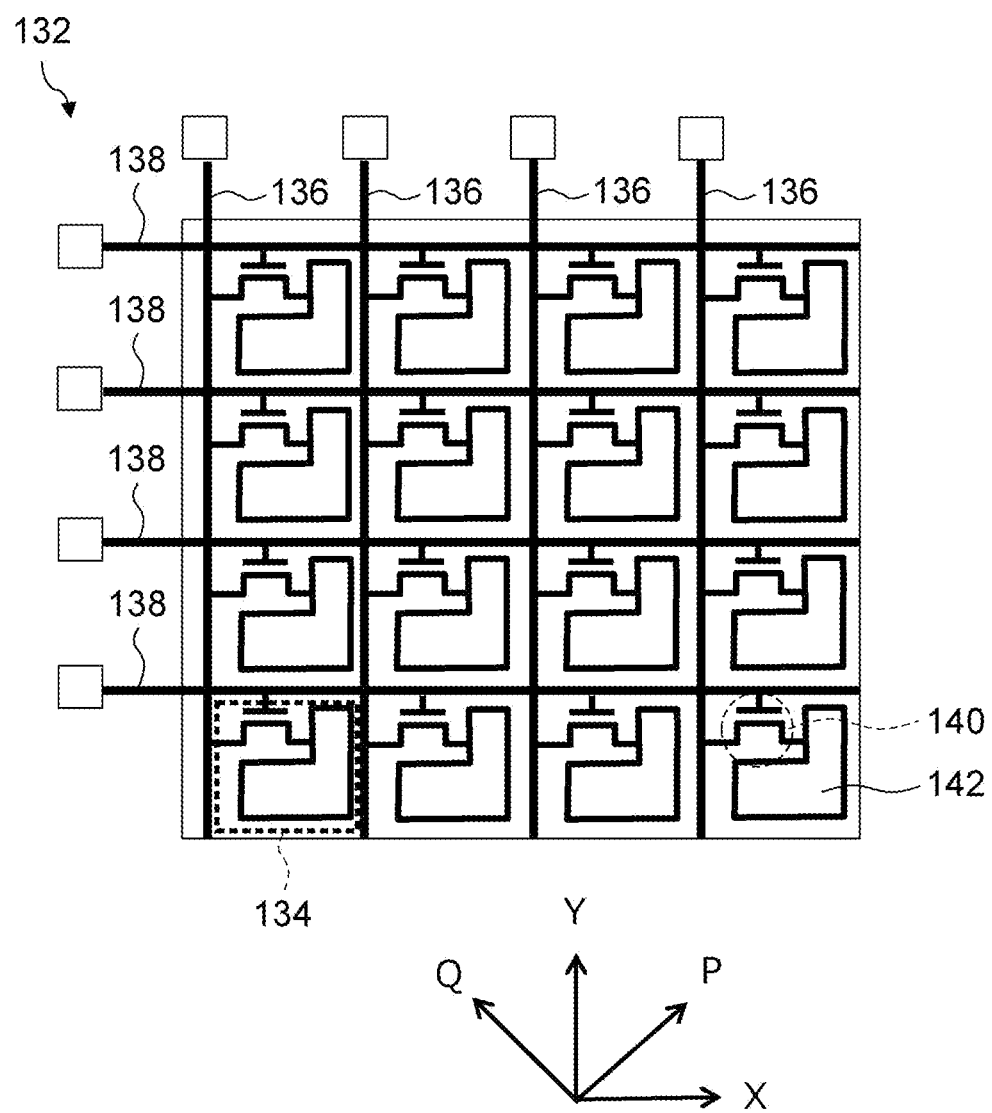
FIG. 11 depicts a structure of a drive circuit included in a display panel of FIG. 10.
Figure 12A:
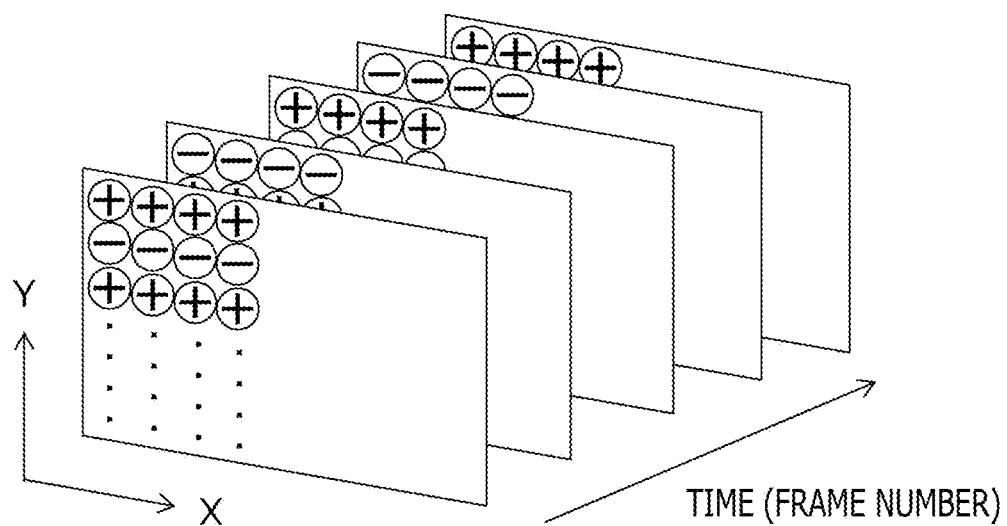
FIG. 12A is a schematic diagram related to a line inversion drive system.
Figure 12B:
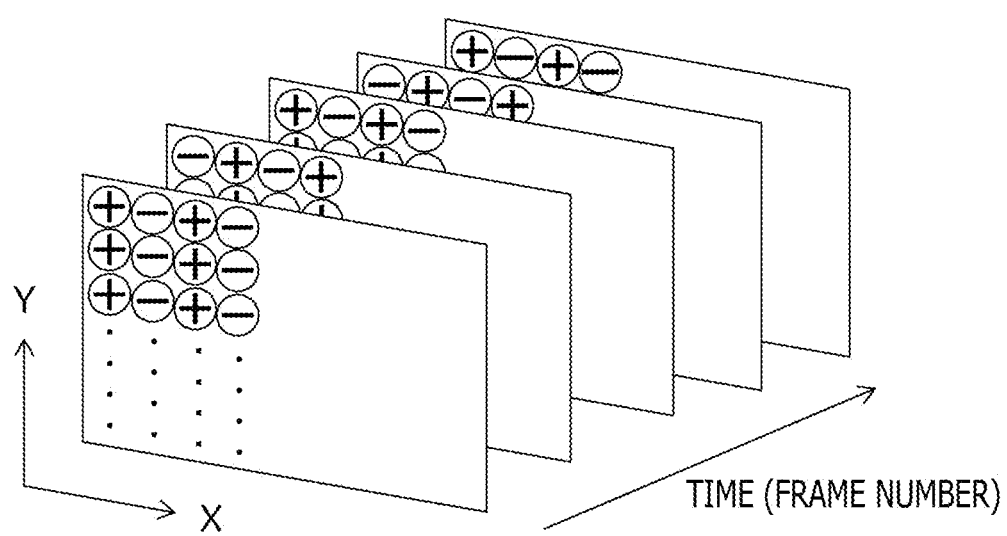
FIG. 12B is a schematic diagram related to another line inversion drive system.

FIG. 11 depicts a structure of a drive circuit 132 included in the display panel 130 of FIG. 10. The drive circuit 132 includes matrix signal lines arrayed in the row direction and the column direction and the plurality of pixels 134 corresponding to intersections of the matrix. The matrix signal lines include a plurality of source signal lines 136 extending in the Y-direction and arranged at equal intervals in the X-direction and a plurality of gate signal lines 138 extending in the X-direction and arranged at equal intervals in the Y-direction.

Each pixel 134 includes a thin film transistor (hereinafter, a "TFT 140") and a pixel electrode 142. The source signal line 136 corresponding to the pixel 134 is connected to a source terminal of the TFT 140. The gate signal line 138 corresponding to the pixel 134 is connected to a gate terminal of the TFT 140. The pixel electrode 142 corresponding to the pixel 134 is connected to a drain terminal of the TFT 140.

The drive circuit 132 drives the display of the display panel 130 on the basis of a "frame inversion system" for applying an alternate current drive voltage to the matrix signal lines. For example, in a "row line inversion system" of FIG. 12A, the drive circuit 132 applies the drive voltage to the plurality of gate signal lines 138 while alternately inverting the positive and negative. On the other hand, in a "column line inversion system" of FIG. 12B, the drive circuit 132 applies the drive voltage to the plurality of source signal lines 136 while alternately inverting the positive and negative.

Configuration of Touch Sensor 102

Figure 13:
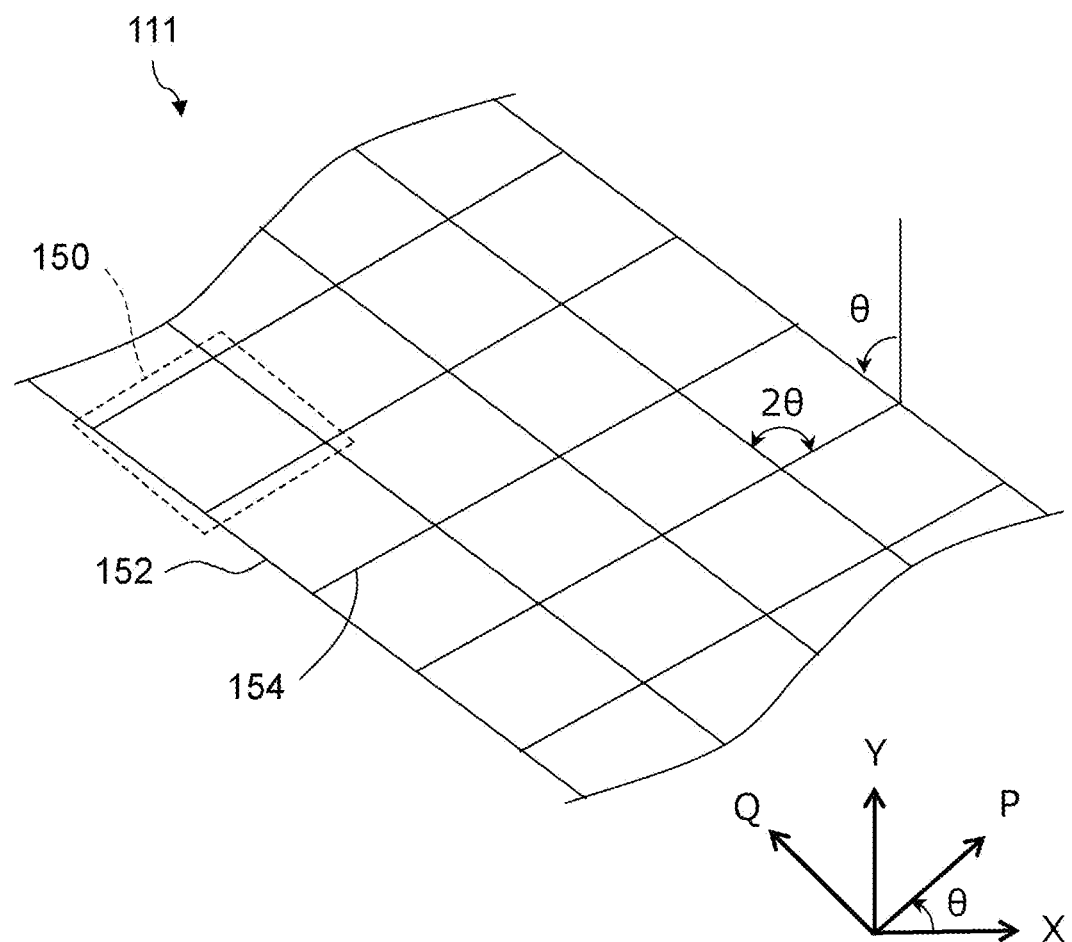
FIG. 13 is a partially enlarged view of a first electrode illustrated in FIG. 9.

FIG. 13 is a partially enlarged view of the first electrodes 111 illustrated in FIG. 9. The first electrodes 111 each include thin metal wires 152 and 154 in a mesh structure including meshes 150 with the same shape arrayed in the Q-direction without a gap. The thin metal wires 152 are arranged to extend in the P-direction, and the other thin metal wires 154 are arranged to extend in a direction intersecting the P-direction (intersection angle is 2θ). As can be understood from FIG. 13, the rhombic mesh 150 is surrounded and formed by two adjacent thin metal wires 152 and two adjacent thin metal wires 154, and one of the interior angles of the rhombic shape is 2θ [rad]. Note that the shape of the mesh 150 may be a rectangle instead of the rhombus or may be a polygon, such as a triangle and a hexagon.

Although not illustrated, the second electrodes 112 (FIG. 9) each include thin metal wires 152 and 154 in a mesh structure including the meshes 150 with the same shape arrayed in the P-direction without a gap. Therefore, the shape of the second electrodes 112 is basically the same as the shape of the first electrodes 111, and the second electrodes 112 are arranged in a direction different from the direction of the first electrodes 111.

Figure 14:
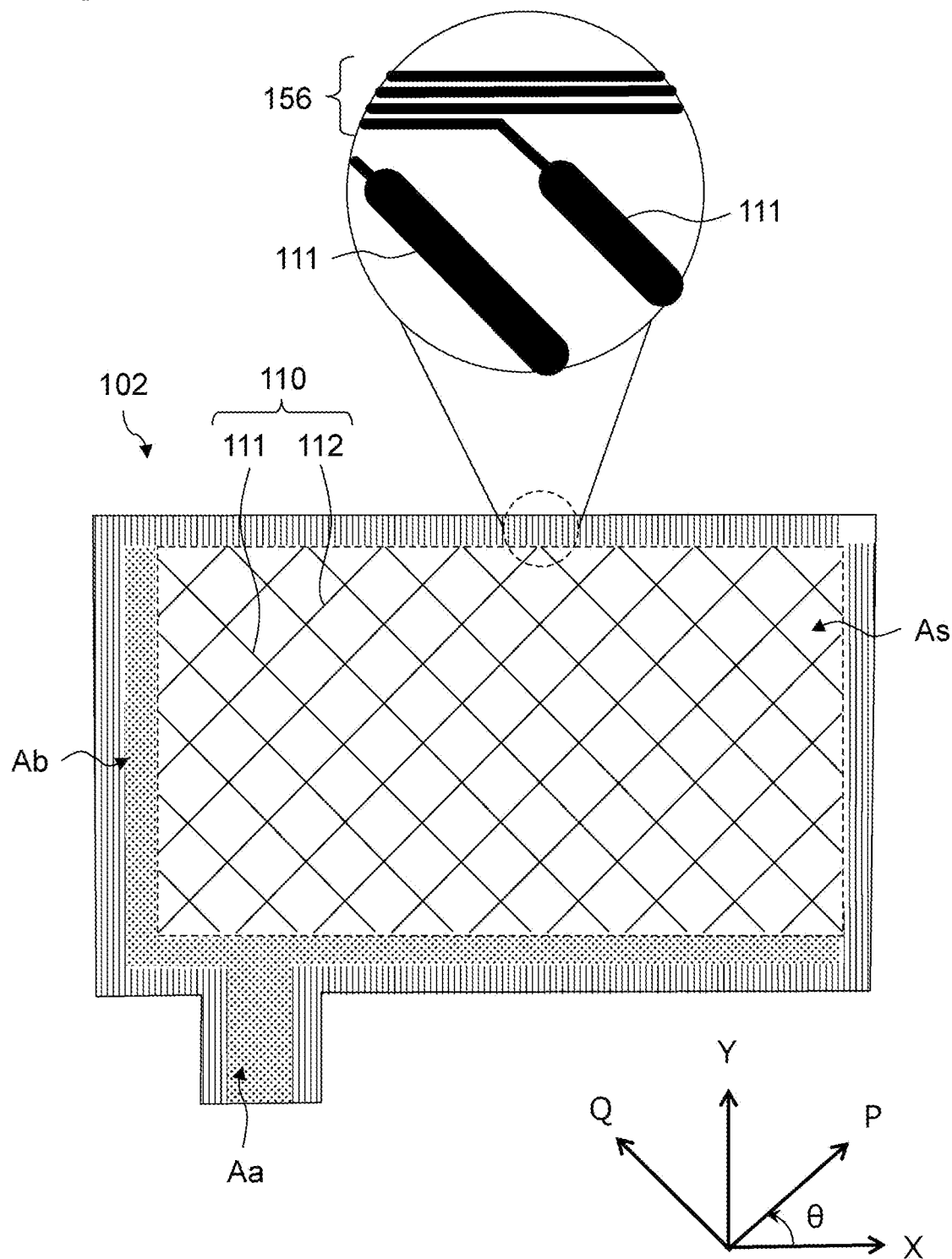
FIG. 14 is a plan view of a touch sensor illustrated in FIGS. 9 and 10.

FIG. 14 is a plan view of the touch sensor 102 illustrated in FIGS. 9 and 10. The touch sensor 102 further includes a bezel area Ab and an aggregate area Aa in addition to the sensor area As in a rectangular shape.

The bezel area Ab is a frame-shaped area surrounding the entire periphery of the sensor area As. Extension lines 156, each provided on one end of each of the plurality of electrodes 110, are wired in the bezel area Ab. The extension lines 156 are signal lines for electrically connecting the touch sensor 102 and the touch IC 104 (P selector 114 and Q selector 116 in the example of FIG. 9). Note that the halftoned section of the bezel area Ab corresponds to a part where the extension lines 156 of the first electrodes 111 are wired. On the other hand, the hatched section with vertical lines in the bezel area Ab corresponds to a part where the extension lines 156 of the second electrodes 112 are wired.

The aggregate area Aa is a band-like area corresponding to the FPC board 54 (FIG. 10). The plurality of extension lines 156 separated from each other and parallel to each other are wired in the aggregate area Aa. Although the aggregate area Aa is provided on the lower left corner of the sensor area As in the example of FIG. 14, the aggregate area Aa may be provided on another section instead (for example, at a center of the long side or at a center of the short side).

First Advantageous Effect

The electronic equipment 100 according to the second embodiment is configured in this way. Next, effects of the electronic equipment 100 will be described with reference to FIGS. 15A to 16B.

Figure 15A:
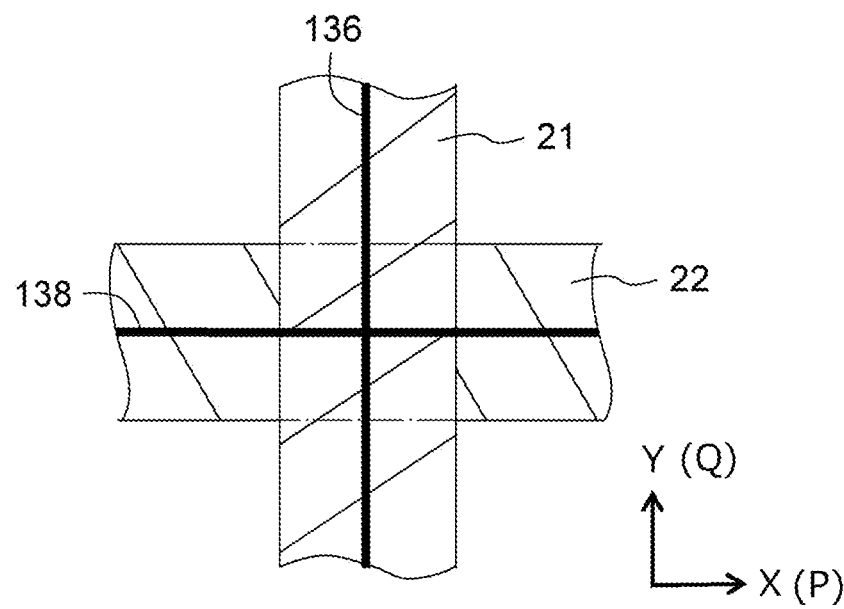
FIG. 15A depicts a comparative example to illustrate a first advantageous effect of the touch sensor in FIG. 14.
Figure 15B:
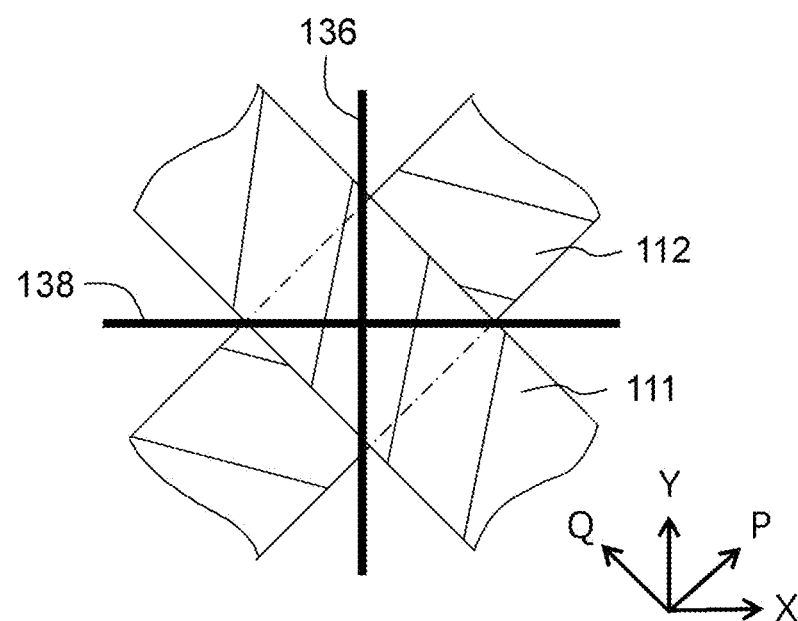
FIG. 15B depicts an example illustrating the first advantageous effect of the touch sensor in FIG. 14.

FIGS. 15A and 15B depict a first advantageous effect of the touch sensor 102 in FIG. 14. Specifically, FIG. 15A illustrates a "comparative example," and FIG. 15B illustrates an "example" of the second embodiment of the present disclosure. For the convenience of illustration, one first electrode 21 (111), one second electrode 22 (112), one source signal line 136, and one gate signal line 138 are depicted.

In the case illustrated in FIG. 15A, the touch sensor 14 of the first embodiment is used, that is, the X-direction coincides with the P-direction, and the Y-direction coincides with the Q-direction. In this case, the first electrode 21 and the source signal line 136 tend to be parallel to each other. Therefore, electromagnetic interference with the source signal line 136 occurs, and common mode noise is easily mixed in the detection signal of the touch sensor 14. Note that there is a similar tendency in the relation between the second electrode 22 and the gate signal line 138.

In the case illustrated in FIG. 15B, the touch sensor 102 of the second embodiment is used, that is, the X-direction does not coincide with the P-direction, and the Y-direction does not coincide with the Q-direction. In this case, the first electrode 111 and the source signal line 136 are always at "twisted positions." Therefore, the electromagnetic interference with the source signal line 136 is unlikely to occur, and this suppresses the mixing of common mode noise in the detection signal of the touch sensor 14. Note that there is a similar tendency in the relation between the second electrode 112 and the gate signal line 138.

As described above, the touch sensor 102 is a sensor used along with the display panel 130 that can apply the drive voltage to the matrix signal lines (source signal lines 136 and gate signal lines 138) arrayed in the X-direction (row direction) and the Y-direction (column direction) to drive the plurality of pixels 134 to thereby display an image or a video in the display area. The touch sensor 102 is arranged so as to at least partially overlap the display area in plan view, and the touch sensor 102 includes the plurality of electrodes 110 arranged in a rectangular shape. The plurality of electrodes 110 include the plurality of first electrodes 111 extended in the Q-direction (first direction) and separated from each other in the orthogonal direction relative to the Q-direction and the plurality of second electrodes 112 extended in the P-direction (second direction) intersecting the Q-direction and separated from each other in the orthogonal direction relative to the P-direction. At least one of the P-direction and the Q-direction is inclined with respect to both the X-direction and the Y-direction.

In this way, at least one of the Q-direction in which the first electrodes 111 are extended and the P-direction in which the second electrodes 112 are extended is inclined with respect to both the X-direction and the Y-direction. Therefore, the "twisted positions" can be always maintained between the electrodes 110 and the matrix signal lines, and this can suppress the mixing of common mode noise, which is caused by electronic interference with the display panel 130, in the detection signal of the touch sensor 102.

Particularly, when the display panel 130 displays an image or a video of each frame on the basis of the "row line inversion system" (see FIG. 12A) for applying the drive voltage to the gate signal lines 138 extending in the X-direction while alternately inverting the positive and negative, it is preferable that the P-direction and the Q-direction each be inclined with respect to the X-direction. The signs of the drive voltage for the gate signal lines 138 are periodically changed in terms of space and time to further suppress the generation of the common mode noise.

Similarly, when the display panel 130 displays an image or a video of each frame on the basis of the "column line inversion system" (see FIG. 12B) for applying the drive voltage to the source signal lines 136 extending in the Y-direction while alternately inverting the positive and negative, it is preferable that the P-direction and the Q-direction each be inclined with respect to the Y-direction. The signs of the drive voltage for the source signal lines 136 are periodically changed in terms of space and time to further suppress the generation of the common mode noise.

Second Advantageous Effect

Figure 16A:
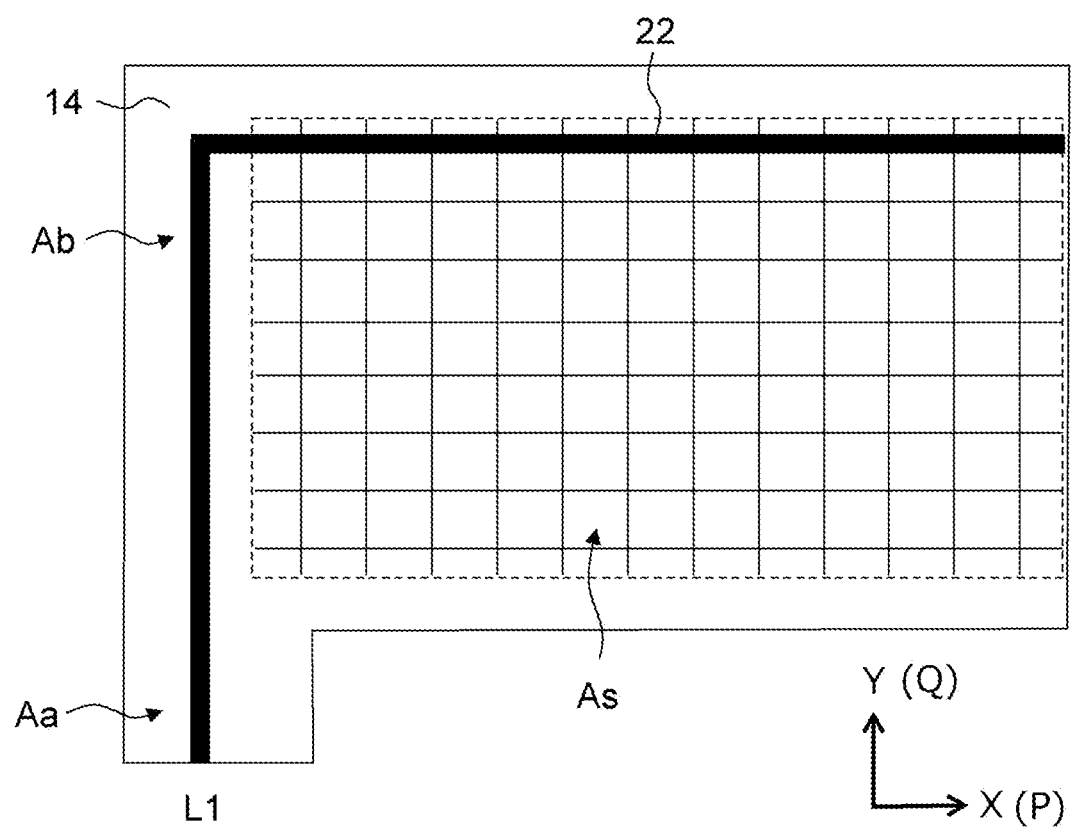
FIG. 16A depicts a comparative example to illustrate a second advantageous effect of the touch sensor in FIG. 14.
Figure 16B:
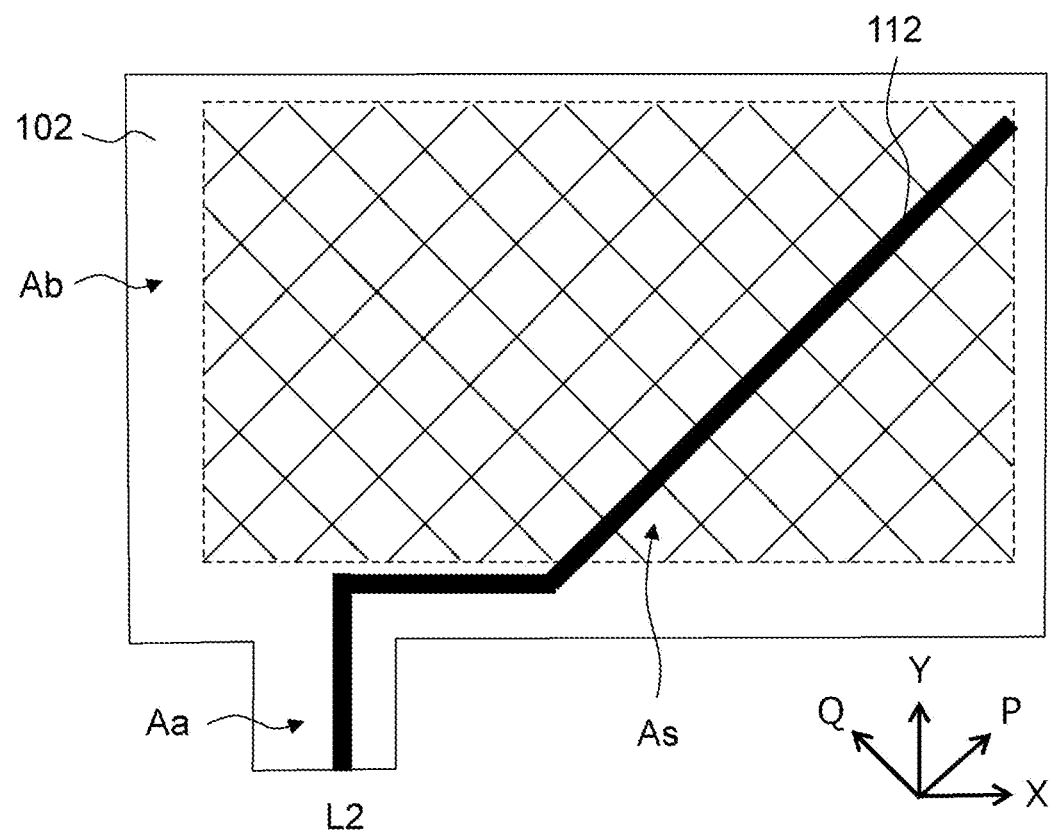
FIG. 16B depicts an example illustrating the second advantageous effect of the touch sensor in FIG. 14.

According to the touch sensor 102, an advantageous effect different from the above-described suppression effect of the common mode noise can also be obtained. A second advantageous effect of the touch sensor 102 will be described with reference to FIGS. 16A and 16B. FIG. 16A illustrates a "comparative example" of using the touch sensor 14 of the first embodiment, and FIG. 16B illustrates an "example" of using the touch sensor 102 of the second embodiment.

For example, it is assumed that the aggregate area Aa is provided on the lower left corner of the sensor area As, and wiring layouts in the second electrodes 22 and 112 closest to the upper long side are designed. For example, in the "comparative example" of FIG. 16A, the wire goes through the upper right corner, the upper left corner, and the lower left corner of the sensor area As. Therefore, a wiring length L1 in a specific electrode 20 is relatively long, and this increases the electrical resistance. On the other hand, in the "example" of FIG. 16B, the wire goes through the upper right corner, the lower center, and the lower left corner of the sensor area As. Therefore, a wiring length L2 in a specific electrode 110 is relatively short, and this reduces the electrical resistance.

In this way, when the touch sensor 102 and the MCU 120 are connected through the plurality of extension lines 156, the extension line 156 may be provided on an end portion, closer to the MCU 120, in the electrode 110 that bridges two adjacent sides (that is, the long side and the short side) of the sensor area As. This can easily reduce the wiring length in a specific electrode 110 compared to the case in which the wire is provided along the periphery of the sensor area As.

The touch sensor 102 may also include the electrodes 110 that bridge two opposing sides (that is, long sides or short sides) in addition to the electrodes 110 that bridge two adjacent sides. This increases the choices regarding on which side the extension lines 156 are to be provided. As a result, there is also an advantageous effect that the degree of freedom in design related to the arrangement of the extension lines 156 is higher than in the touch sensor 14 (FIG. 1) of the first embodiment.

What is claimed is:

1. Electronic equipment comprising:
   a touch sensor including a plurality of electrodes arranged in a plane shape and separated from each other in an array direction;
   a differential amplifier that amplifies a difference between a positive-side signal and a negative-side signal selectively output from the plurality of electrodes and that outputs the difference;
   a position detection unit that detects a touch position in a sensor area that is formed by the touch sensor, based on an output signal from the differential amplifier; and
   a conductive part that is a part made of a conductive material or contains a conductive material and that is arranged to partially overlap the sensor area in plan view, wherein
   the conductive part is arranged such that an outermost end point thereof in the array direction is positioned on one of the plurality of electrodes.

2. The electronic equipment according to claim 1, wherein the plurality of electrodes include
   a plurality of first electrodes separated from each other in a first direction, and
   a plurality of second electrodes separated from each other in a second direction intersecting the first direction, and
   the conductive part is arranged such that the end point is positioned in an intersection area where one of the plurality of first electrodes and one of the plurality of second electrodes intersect.

3. The electronic equipment according to claim 1, wherein the conductive part is a heat sink, a heat conduction path, or a battery pack.

4. The electronic equipment according to claim 1, wherein,
- when an electrode overlapping the end point in plan view is defined as an end-side electrode,
- the conductive part is arranged such that a length of a contour line overlapping the end-side electrode is equal to or greater than 10 mm.

* * * * *